United States Patent

[11] 3,581,986

[72] Inventor Antonio Magri
 Milan, Italy
[21] Appl. No. 821,915
[22] Filed May 5, 1969
[45] Patented June 1, 1971
[73] Assignee Coster Tecnologic Elettroniche S.p.A.
 Milan, Italy
[32] Priority May 11, 1968
[33] Italy
[31] 16356 A/68

[54] CIRCUIT FOR AUTOMATICALLY CONTROLLING THE TEMPERATURE IN HEATING OR CONDITIONING SYSTEMS
4 Claims, 3 Drawing Figs.

[52] U.S. Cl. .................................................. 236/91,
 236/78
[51] Int. Cl. ........................................ G05b 11/32,
 G05d 23/24
[50] Field of Search ........................................... 236/91, 78
 B, 78 A, 9 A

[56] References Cited
UNITED STATES PATENTS

| 2,063,613 | 12/1936 | McCarthy ..................... | 236/91 |
| 2,282,442 | 5/1942 | Whitlock ....................... | 236/78 |
| 2,375,988 | 5/1945 | Gille et al. ..................... | 236/91 |
| 3,216,662 | 11/1965 | Gerzon .......................... | 236/91X |

Primary Examiner—William E. Wayner
Attorney—Ernest Montague

ABSTRACT: An automatic temperature control circuit comprising a bridge having three parallel branches, each provided with a supply resistor of a high ohmic value relative to series connected resistors, the resistors for two of the branches being thermoresistances measuring the external temperature and the average temperature for the heat transfer means, respectively, and the resistor for the third branch being series connected to a settable impedance means for setting the desired room temperature.

3,581,986

CIRCUIT FOR AUTOMATICALLY CONTROLLING THE TEMPERATURE IN HEATING OR CONDITIONING SYSTEMS

The present invention relates to a circuit for continuously automatically controlling heating or conditioning systems, the control being carried out on the heat transfer means, particularly water, steam and air, and the control being performed substantially in connection with two parameters comprising the external temperature and the desired room temperature.

At present various devices are known for providing the above control, such devices exhibiting, however, one or more of the following drawbacks: (a) complex calibrations are required for fitting the control device to a system, it being particularly required to read and make out special diagrams associated with the equipment; (b) the desired room temperature cannot be preselected directly in degrees centigrade, it being necessary instead to predetermine a certain temperature for the heat transfer means; thus, the abscissa on the aforesaid diagrams quotes the external temperature, while the coordinate quotes the temperature for the heat transfer means, no reference being made to the temperature which will be established within the rooms to be heated; (c) control is carried out on only the outlet temperature for the heat transfer means and not on the actual temperature for the heating or conditioning members (radiators or the like).

A main object of the present invention is to provide a temperature control circuit enabling direct preselection of the desired room temperature, as read in degrees Centigrade or degrees Fahrenheit on the member (knob) intended for the preselection.

It is a further object of the present invention to provide a circuit by means of which the actual temperature for the heating members is calculated.

It is still a further object of the present invention to provide a circuit readily adaptable, or adjustable, to the specific heating or conditioning system being controlled thereby.

In accordance with the present invention there is provided a circuit by comprising: (a) means for generating a signal proportional to the temperature differential between the room to be controlled and the external ambient; (b) means for generating a signal proportional to the difference between the temperature of the heating or conditioning means and the external temperature; and (c) means for comparing such temperature differentials to provide a signal for controlling the heating or conditioning means.

It is still yet another object of the present invention to provide a circuit for automatic temperature control comprising three parallel branches, and at least one resistor in each branch having a high ohmic value relative to series connected resistors. In two of the branches at least one of the series connected resistors are thermoresistances measuring the external temperature and the average temperature for heat transfer means, respectively. The resistor for the third branch is series connected to a settable impedance means for setting the desired room temperature.

With these and other objects in view, which will become apparent in the following detailed description, the present invention will be clearly understood in connection with the accompanying drawings, in which: FIG. 1 is a diagrammatic view showing a heating system as controlled by the circuit of the invention;

Figure 1:
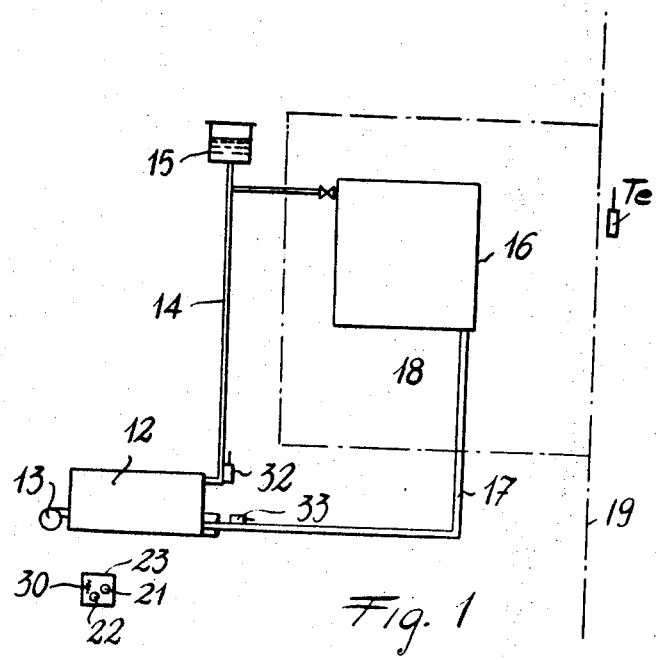

It should be stated in advance that the circuit of the invention, although described and shown herein for controlling the operation of a hot water heating system, is applicable without any difficulty to different heating systems, such as steam heating system, hot air heating system and the like, and may be operative on a mixing valve in lieu of a burner.

In this disclosure, and in the claims as well, to define the same, temperature reference is made sometimes to the temperature for the heat transfer means and other times to the temperature for the heating members (such as radiators); this is not strictly correct. However, from a practical standpoint, that is, for these applications, it may be deemed that the temperature at a given location of the heat transfer means and that at such a location on the conduit wall, wherein the means move, are identical. Therefore, reference to either definition will not result in any restriction to the covering field of the invention.

The circuit according to the invention is based on some theoretical considerations and simplifications, the adoption of which will not substantially affect the actual running conditions, as experimentally shown.

The formula governing quite approximately the heat exchange between the heating members (such as a radiator), room to be heated and external environment is as follows:

$$K_1(Tr-Ta) = K_2(Ta-Te)$$

wherein $K_1$ and $K_2$ are the constants for the total heat conduction between the transfer means and internal room to be heated or conditioned, and between the internal room and the external environment (such as the atmosphere), while $Tr$, $Ta$ and $Te$ are the temperatures for the transfer means, (or heating member), the internal room and the external environment, respectively.

In the above formula, the first term is the amount of heat being supplied from the heating members to the room to be heated, and the second term is the amount of heat from the room to be heated and the external environment. Theoretically, it may be supposed that the heat provided by the heating members is directly supplied to the external environment, as actually the heat of the room to be heated does.

Therefore, it could be:

$$K_1(Tr-Ta) = K_2(Ta-Te) = K_3(Tr-Te)$$

The third term should be equivalent to the first two terms, being the heat flow as theoretically supplied from the heating members to the external environment.

The formula used in the circuit of this invention is as follows:

$$K_2(Ta-Te) = K_3(Tr-Te) \qquad (1)$$

This formula may be also expressed as:

$$Ta - Te = \frac{Tr - Te}{K}$$

wherein $K$ is the ratio between the two conduction constants.

It will be seen from this formula that, where the external temperature is $Te$, and a room temperature $Ta$ is desired and a system having a factor $K$, it will always be possible to predetermine and control the heating member temperature $Tr$ meeting the above equation and, therefore, the system control. For example, where the first term is smaller than the second, it means that the ignition of the burner for a heating system is required, and conversely.

Figure 2:
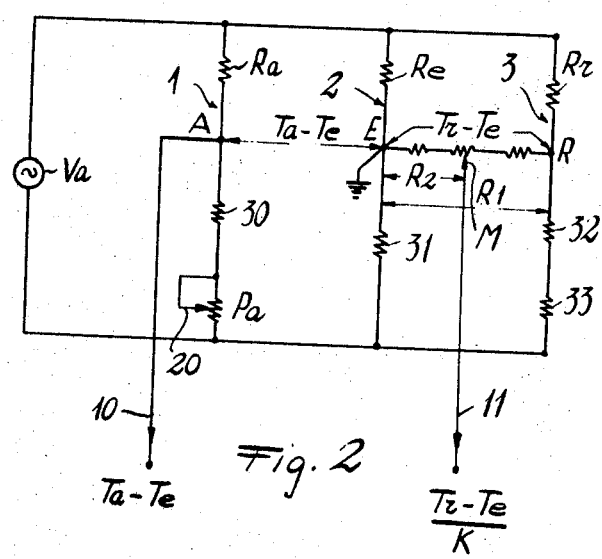
FIG. 2 shows the control circuit of the invention.

For a practical embodiment of this formula, the invention provides the circuit shown in FIG. 2.

The circuit comprises an AC electric supply source Va, such as 24 volts. This source supplies three parallel connected branches, 1, 2 and 3 shown as an entity.

Branch 1 comprises a resistor Ra having a high ohmic value (such as 5.1 Kohm), a fixed resistor 30 (such as 100 ohms) and a potentiometer Pa (such as 22 ohms) series interconnected. A conductor 10 is bypassed at a location A between the resistors Ra and 30. On operating the potentiometer Pa, and where the above indicated numerical values are adopted, the resistance Ra 30 can assume all of the values between 100 and 122 ohms, that is, all of the values being assumed by a 100 ohm thermoresistance at 0° C. (temperature coefficient ≈ 0.6 ohm/°C.) when the temperature varies from 0° C. to about 35° C.

Branch 2 comprises, as series interconnected, a resistor Re having a high ohmic value (such as 5.1 Kohm) and a standard thermoresistance 31 (such as 100 ohm at 0° C). A point E between the two resistances is grounded.

Branch 3 comprises a resistor Rr having a high ohmic value (such as 5.1 Kohm) and two identical standard thermoresistances 32, 33 (such as 50 ohms at 0° C.). Between a point R, located between the resistance Rr and point E, there is connected a voltage divider, the slider M of which is connected to a conductor or lead 11.

In order to better understand how this circuit can provide outlet signals proportional to the temperature differentials in formula (1), reference should be made to FIG. 1. In this figure, a hot water heating system comprising a boiler 12 and a burner 13 is diagrammatically shown. The boiler delivery side is connected through conduit 14 to the usual expansion tank 15 and a radiator 16. The radiator outlet is connected to boiler 12 through the return conduit 17. The radiator is located within the room 18 to be heated, shown by dot-dash lines. Room 18 is separated from the external environment (atmosphere) by wall 19.

Within the environment of the boiler 12, the resistor 30, potentiometer Pa, voltage divider, as well as resistors Ra, Re and Rr are located. The sliding contact 20 of potentiometer Pa is controllable by a knob 21 provided with an index or pointer which is moved alongside a degree Centigrade degree scale. The moving contact M of voltage divider is connected to a knob 22. The knobs are carried on a panel 23.

The thermoresistance 31 is for measuring the external environment temperature, a voltage proportional to the external temperature appearing across the thermoresistance. Thermoresistance $Tr_a$ is closely adjacent conduit 14 near the connection with boiler 12, while thermoresistance 33 is closely adjacent the return conduit 17 near the boiler. Since these two thermoresistances are series interconnected, there appears across the same a voltage proportional to the temperature of radiator 16 (which may be deemed as equivalent to the water inlet and outlet average temperature).

From the foregoing, a voltage differential will establish between points A and E proportional to the desired temperature differential in room 18 and external environment, that is, proportional to $Ta-Te$ and between points R and E there will be provided a voltage differential proportional to the temperature differential between the radiator 16 and external environment, or to $Tr-Te$. As the two amounts are related to temperature $Te$, point E may be connected to any potential, being particularly grounded. Since the divider is interposed between points R and E, a voltage rate of $Tr-Te/K$ is drawn therebetween, wherein $K=K_1/K_2$, $K_1$ and $K_2$ being the total value of the divider and the value between M and E, respectively. At the circuit outlets, that is across leads 10 and 11, signals are thus available as corresponding to the two terms $Ta-Te$ and $Tr-Te/K$. These terms are compared to each other by means of a usual electronic comparator 40, the outlet signal of which controls a relay governing the burner 13 by igniting or extinguishing it, as required.

It should be noted that when desiring to change the room temperature, it is only needed to operate knob 21 of potentiometer Pa, while when the bridge on a system is to be calibrated it will suffice to operate the divider knob 22.

For example, assuming that the desired room temperature is 20° C., the potentiometer Pa will be set therefore at mark 20. Should the external temperature also be 20° C., the term $Ta-Te$ would be 0. In order that equation (1) is valid, the requirement is that also $Tr-Te$ should be 0, and hence $Tr$ has to be 20° C. Thus, the heating system will keep the radiator automatically at 20° C., as an average temperature, so that the room will be neither heated nor cooled.

Assuming that the external temperature drops to 0° C., the term $Ta-Te$ will be 20, as well as for the term $Tr-Te/K$.

Assuming that for the particular system, $K$ is 3, then $Tr-Te$ is 60 (60/3 =20). This means that the average temperature of the radiator will be brought automatically to 60° C. and the room temperature will be kept at 20° C., notwithstanding that the external temperature is 0° C.

Should the value $K$ for the system differ from 3, knob 22 would be acted upon until the system automatically gives a room temperature as desired (20° C.).

As seen, to calibrate the circuit, it is only required to know the desired room temperature, then controlling this is the temperature being provided, in contrast with all of the other regulators wherein it is required to preselect time by time the temperature of the circulating water without any knowledge about the temperature provided in the rooms, as this temperature is not calculated.

Figure 3:
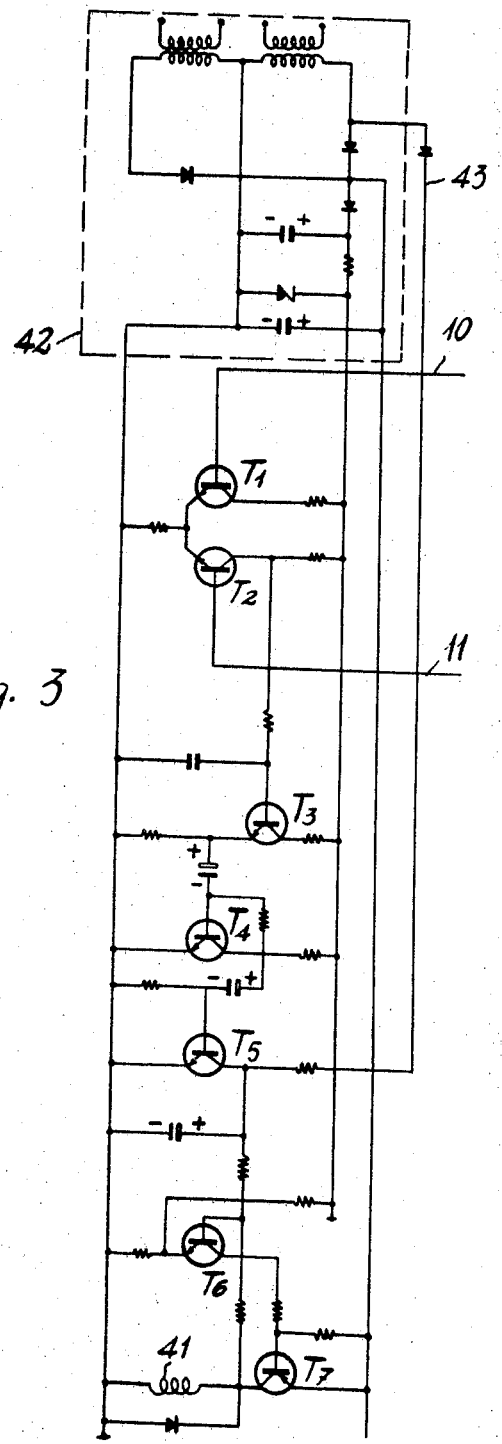
FIG. 3 shows the control circuit of the invention as used for controlling the ignition and extinguishment of the burner for the system in FIG. 1.

FIG. 3 shows a possible type of electronic comparator 40 incorporating amplifying stages, and operative to control relay 41 for igniting and extinguishing the burner 13. Since this comparator is no part of the present invention and of known construction, it will be briefly described.

The electronic comparator is a transistor comparator comprising a DC supply section 42 provided with a full wave rectifier and related filter. This section also comprises a half wave rectifier outlet.

The two leads 10 and 11 are connected to the bases of two transistors $T_1$ and $T_2$ forming a differential amplifier. The unbalance between the signals applied to the bases causes a signal to be applied through the amplifying stages comprising the transistors $T_3$, $T_4$, $T_5$ and $T_6$ to the base of the power transistor $T_7$, which is rendered conductive and thus enables the relay 41 to be energized. Particularly, lead 43 is connected with the collector of transistor $T_5$, whereby the latter is conductive when the half wave is applied and a signal appears on the base thereof.

All of this is well known in the art.

I claim:

1. A circuit for automatically temperature controlling, comprising:
   means for generating a signal proportional to the temperature differential between a room to be controlled and the external environment,
   means for generating a signal proportional to the temperature differential between the heating or conditioning means and the external environment,
   means for comparing the temperature differentials to provide a signal for controlling the heating or conditioning means,
   said circuit including three parallel branches,
   series connected resistors in each branch, at least one of said resistors in each branch having a high ohmic value relative to the other of said series connected resistors in each branch,
   at least one of said series connected resistors in two of said branches being thermoresistances measuring the external temperature and the average temperature for heat transfer means, respectively, and
   a settable impedance means for setting the desired room temperature and connected in series with said resistors of the third branch.

2. A circuit, as set forth in claim 1 wherein
   said thermoresistance for measuring the average temperature of the heat transfer means comprises two identical thermoresistances, one on the outlet side and the other on the return side of said heat transfer means.

3. The circuit, as set forth in claim 1, further comprising
   a divider for circuit calibration is interposed across two parallel branches at an intermediate location thereof, ahead of said thermoresistances, but following the high ohmic value resistors.

4. The circuit, as set forth in claim 1, wherein said impedance means is a potentiometer.